(12) United States Patent
Yan

(10) Patent No.: US 7,378,467 B2
(45) Date of Patent: May 27, 2008

(54) ZEOLITE ANTI-BLOCKING AGENTS

(76) Inventor: Er Ming Yan, House 7, Casa Marina I, 20 Lo Fai Road, Tai Po, New Territories, Hong Kong (CN)

( * ) Notice: Subject to any disclaimer, the term of this patent is extended or adjusted under 35 U.S.C. 154(b) by 598 days.

(21) Appl. No.: 10/944,888

(22) Filed: Sep. 21, 2004

(65) Prior Publication Data

US 2005/0064179 A1    Mar. 24, 2005

(30) Foreign Application Priority Data

Sep. 22, 2003    (GB) .................. 0322167.8

(51) Int. Cl.
   *C08K 3/34*    (2006.01)
(52) U.S. Cl. ...................... 524/450; 524/445
(58) Field of Classification Search .............. 524/450, 524/445
   See application file for complete search history.

(56) References Cited

U.S. PATENT DOCUMENTS

| | | |
|---|---|---|
| 3,509,082 A | 4/1970 | Mays |
| 4,250,081 A | 2/1981 | Bode et al. |
| 4,420,582 A | 12/1983 | Canard et al. |
| 4,636,340 A | 1/1987 | Itaba et al. |
| 4,785,042 A | 11/1988 | Azuma et al. |
| 5,605,737 A | 2/1997 | Lee et al. |

FOREIGN PATENT DOCUMENTS

| | | |
|---|---|---|
| EP | 0 227 168 A2 | 7/1987 |
| EP | 0 492 463 B1 | 7/1992 |
| EP | 0 810 261 A1 | 12/1997 |
| JP | 60-088049 | 5/1985 |
| JP | 61-223046 | 10/1986 |
| JP | 64-047337 | 2/1989 |
| JP | 1031838 | 2/1989 |
| JP | 05-009349 | 1/1993 |
| JP | 2003-292687 | 10/2003 |

OTHER PUBLICATIONS

Derwent Abstract Abstract Accession No. 84-165474/27, and DD 207550 A (Veb Leuna-Werk Ulright) Mar. 7, 1984, Abstract.
Derwent Abstract Accession No. 2002-158279/21, and JP 2001-288311 A (Japan Polyolefins Co Ltd) Oct. 16, 2001, Abstract.
Australian Patent Office Search Report dated Jul. 25, 2005.

*Primary Examiner*—Edward J. Cain
(74) *Attorney, Agent, or Firm*—Buchanan Ingersoll & Rooney PC

(57) ABSTRACT

A plastics film is disclosed as including (a) polyethylene (PE) or polypropylene (PP) and (b) a zeolite as an anti-blocking agent, in which secondary particles of the zeolite are formed of aggregation of primary particles of the zeolite and a majority of the secondary particles are of a diameter of less than substantially 0.4 micron. The primary particles are also of a diameter of less than 0.4 micron. A masterbatch for the production of such a plastics film is also disclosed as including (a) polyethylene or polypropylene and (b) a zeolite as an anti-blocking agent, in which secondary particles of the zeolite are formed of aggregation of primary particles of the zeolite and a majority of the secondary particles are of a diameter of less than substantially 0.4 micron, and the primary particles are of a diameter of less than 0.4 micron.

47 Claims, 12 Drawing Sheets
(4 of 12 Drawing Sheet(s) Filed in Color)

ATMOSPHERIC PRESSURE

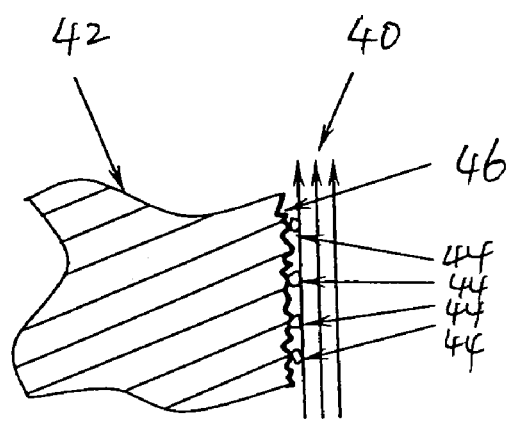
Fig. 8
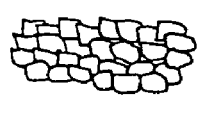 
Fig. 9         Fig. 10

ZEOLITE ANTI-BLOCKING AGENTS

This invention relates to a plastics film made at least principally of polyethylene (PE) or polypropylene (PP) further including an anti-blocking agent, a use of a zeolite as an anti-blocking agent in the production of such a plastics film, a masterbatch for the production of such a plastics film, a method of producing an anti-blocking masterbatch for the production of such a plastics film, a PP or PE resin including such an anti-blocking agent and a method of producing such a resin.

Anti-blocking agent is a common and useful additive for the manufacture of plastics films. Almost all plastics films contain an anti-blocking agent. As shown in FIG. 1, during manufacture of plastics films, after the plastics material 12 passes through a pair of rollers 14, it is still hot and under press, and then wound onto a winding roller 14a. As shown in FIG. 2, as the retrieved films 16 are under rolling pressure, winding roller tension and atmospheric pressure, the films 16 tend to stick together, making it difficult to separate the film layers. This is best illustrated by the common difficulty we experience when trying to open clear plastics bags for package grocery items or single layer film for packing and covering. Problems also occur when plastics films are wound onto and off film rolls. In addition, a long sought-for goal in the field is to obtain an anti-blocking agent which is of both high effectiveness and high transparency.

The adhesion between the film layers, usually called blocking, is an inherent property of a number of polymers, including PE and PP. Anti-blocking agents are thus added to the plastics film formulation, with a view to lowering the blocking force between the film layers.

In terms of the principle of operation, there are basically two types of anti-blocking agents, namely fine particle type and migrate type.

For fine particle type anti-blocking agents, as shown in FIGS. 3 and 4, fine particles 20 are added into the polymer, so that protruded spots are formed on the surface of the films 16. The anti-blocking agent particles protrude on the film surface to separate the films 16 and reduce blocking force. In particular, a micro-rough surface is thus formed on the films 16, thus allowing air to permeate between the film layers 16, to thereby reduce the adhesion between the film layers 16, even if the films 16 are still under atmospheric pressure.

There are many types of particles which can be used as fine particle type anti-blocking agents, and they vary significantly in terms of quality and cost. The cheapest types of such anti-blocking agents are natural talc or silica ($SiO_2$), the latter being shown in FIG. 11. Such materials are of a lower transparent property and poor in purity.

Nowadays, fine particle type anti-blocking agents of the highest transparency and highest anti-blocking ability is low-density synthetic silica, as shown in FIG. 12.

As to migrate type anti-blocking agents, they will migrate out to the surface of the films 16, especially in high temperature. This will avoid the sticking of films on rollers of production machines, packing machines and processing machines. As shown in FIG. 5, anti-blocking agents will migrate from the film layers 16 to the surface 28, thus achieving anti-blocking effect. Migrate type anti-blocking agents provide not only film opening property, but also slipping property.

It is also possible to classify anti-blocking agents into organic types, e.g. amide waxes, and inorganic type, e.g. talc, natural and synthetic silica.

As technology in the plastics bag industry advances, people continue to expect a higher degree of transparency of the bags. Transparency is not only affected by the base materials and the ratio of various chemicals constituting the materials, but also by the type of anti-blocking agents used. All existing fine particle type anti-blocking agents have negative impact on the transparency of plastics bags, with the most common problem being the production of "haze" inside the thin plastics films. The amount of haze so created usually depends on the following characteristics of the anti-blocking agents:

a. the impurity of the anti-blocking agents—fine particle type anti-blocking agents consisting of natural minerals is usually less pure than synthetic anti-blocking agents, so that the latter can provide a higher transparency effect; and b. the refractive index of the anti-blocking agent—when light passes through two different materials, if the two media share very similar refractive indexes, then the loss of light after passing through the plastics film can be minimized. On the other hand, if the two media are of very different refractive indexes, there will be a noticeable loss of light after transmission of the light through these two materials. As shown in FIGS. 6 and 7, when a light ray 30 enters from air 32 into a film 34 made of a plastics material, e.g. PE or PP, refraction will occur. When the light ray 30 then enters a particle 36 of anti-blocking agent in the film 34, a second refraction will occur, the extent of which being dependent on the refractive indexes of the plastics material and the anti-blocking agent, as in the following formula:

$$\sin \alpha / \sin \beta = \text{refractive index of anti-blocking agent particle/refractive index of base plastics material}$$

When the light ray 30 exits the particle 36 and enters the film 34 again, another refraction will occur. It can be seen that if the refractive index of the particle of the anti-blocking agent is closer to that of the base plastics material with which the film 34 is made, the less deviation of the light ray 30, and thus the less loss of light, will occur.

The refractive index of natural talc and silica ($SiO_2$) is 1.57 and 1.46 respectively, whereas the refractive index of PE and PP is 1.49 and 1.50 respectively. Due to the difference in the refractive indexes, natural talc and silica will significantly reduce the amount of light passing therethrough and will thus have a negative effect on the transparency of plastics bags, in particular PE and PP bags, produced with plastics material incorporated with natural talc or silica as an anti-blocking agent.

Effectiveness of inorganic particle type anti-blocking agents depends on:

i. particle size—the larger the particle size, the rougher the film surface;

ii. particle shape—amorphous shape particles will make the film surface rougher than round shape particles;

iii. the total number of added anti-blocking agent particles—the larger the number of particles, the rougher the film surface; and iv. coating of particles—when the particles are coated by chemical, which can migrate out from molten PE and PP (by polarity or other mechanisms), such will help the particles to protrude on the film surface, thus enhancing roughness of the film surface.

A further consideration in the choice of anti-blocking agents is their hardness. Referring to FIG. 8, when molten plastics material 40 containing anti-blocking agents flow through a substrate 42 of a machine, e.g. during the production of masterbatch for subsequent manufacture of plastics film, the anti-blocking agent particles 44 will rub against a surface 46 of the substrate 42. For example, silica crystals are of a Mohs hardness of 7. As a comparison, diamond is of a Mohs hardness of 10. Use of such hard anti-blocking agents will increase the wear of the parts of the machine with which the anti-blocking agents come into contact. In this connection, it is found that for primary particles bound with one another via chemical force (as shown in FIG. 9), their aggregates are densely packed, solid, and their shapes cannot be changed, whereas for primary particles bound with one another via physical attraction force, namely van der Waals force, (as shown in FIG. 10), their agglomerates are loosely packed, soft, and their shapes can be changed relatively easily.

It is thus an object of the present invention to provide a film incorporated with natural sea sponge-like structured particles as an anti-blocking agent and the use of such particles as an anti-blocking agent, in which the aforesaid shortcomings are mitigated, or at least to provide a useful alternative to the public.

According to a first aspect of the present invention, there is provided a plastics film including (a) polyethylene (PE) or polypropylene (PP) and (b) a zeolite as an anti-blocking agent, wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

According to a second aspect of the present invention, there is provided a use of a zeolite as an anti-blocking agent in the production of a plastics film made at least principally of polyethylene (PE) or polypropylene (PP), wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

According to a third aspect of the present invention, there is provided a masterbatch for the production of a plastics film, including (a) polyethylene or polypropylene and (b) a zeolite as an anti-blocking agent, wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

According to a fourth aspect of the present invention, there is provided a method of producing an anti-blocking masterbatch, including the step of adding zeolite into polyethylene (PE) or polypropylene (PP) resin during polymerization process as an anti-blocking agent, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

According to a fifth aspect of the present invention, there is provided a polyethylene (PE) or polypropylene (PP) resin including zeolite as an anti-blocking agent, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

According to a sixth aspect of the present invention, there is provided a method of producing a polyethylene (PE) or polypropylene (PP) resin, including the step of adding zeolite into polyethylene (PE) or polypropylene (PP) resin during polymerization process, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

The application file contains at least one drawing executed in color. Copies of this patent application with color drawings will be provided by the office upon request and payment of the necessary fee.

An embodiment of the present invention will now be described, by way of an example only, with reference to the accompanying drawings and photographs, in which:

FIG. 8 shows molten material containing an anti-blocking agent passing by a surface of a substrate of a machine;

FIG. 9 shows the structure of primary particles bound with one another via chemical force;

FIG. 10 shows the structure of primary particles bound with one another via physical attraction force;

Figure 1:
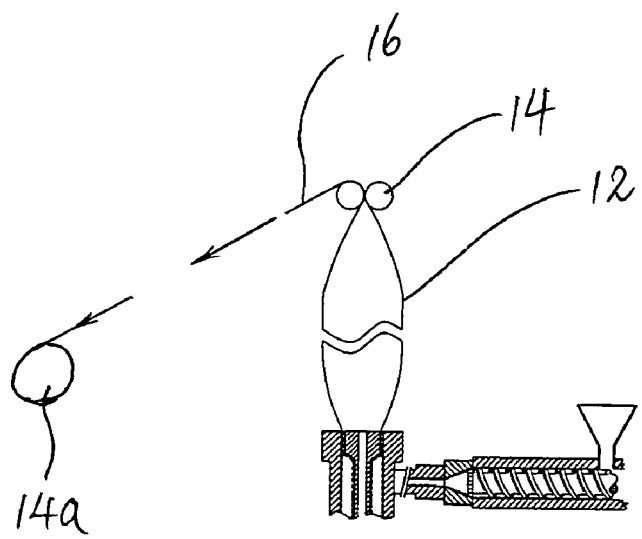
FIG. 1 is a schematic diagram showing production of plastics films.
Figure 2:
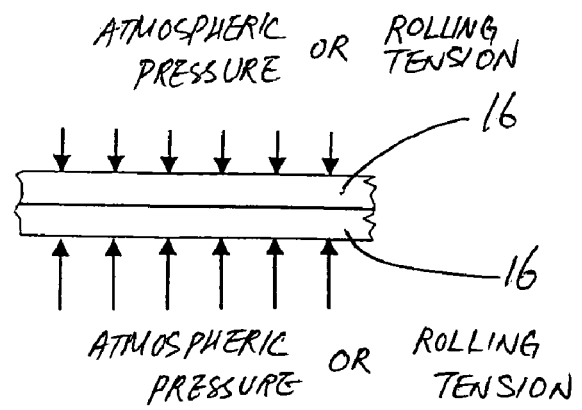
FIG. 2 is a schematic diagram showing the blocking phenomenon.
Figure 3:
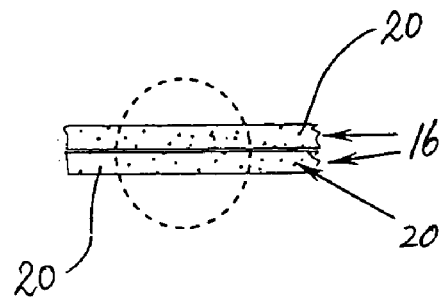
FIG. 3 shows the principle of operation of particle type anti-blocking agents.
Figure 4:
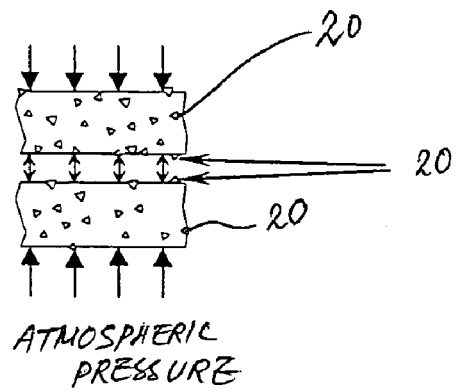
FIG. 4 is an enlarged view of the part encircled in FIG. 3.
Figure 5:
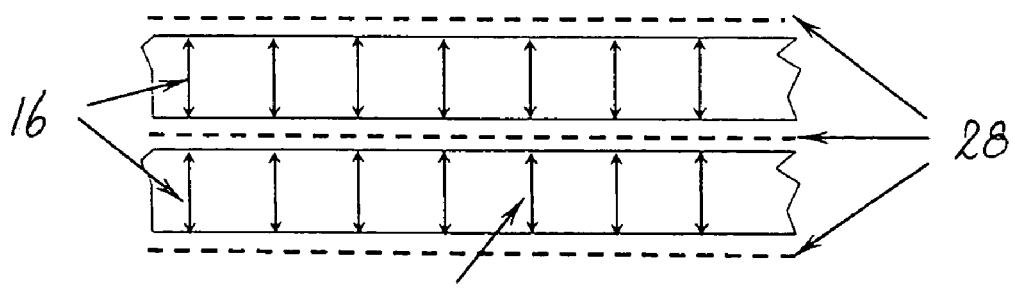
FIG. 5 shows the principle of operation of migrate type anti-blocking agents.
Figure 6:
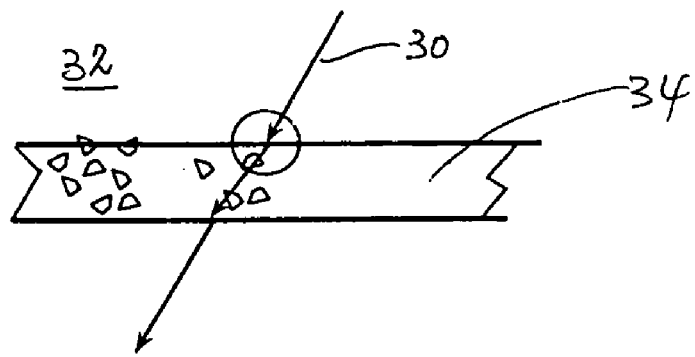
FIG. 6 shows the path of a light ray passing through a film containing anti-blocking agents.
Figure 7:
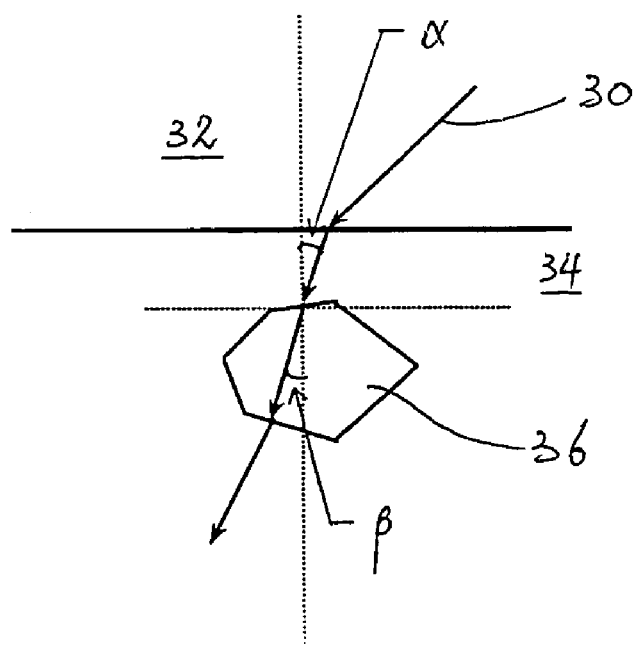
FIG. 7 is an enlarged view of the part encircled in FIG. 6.
Figure 11:
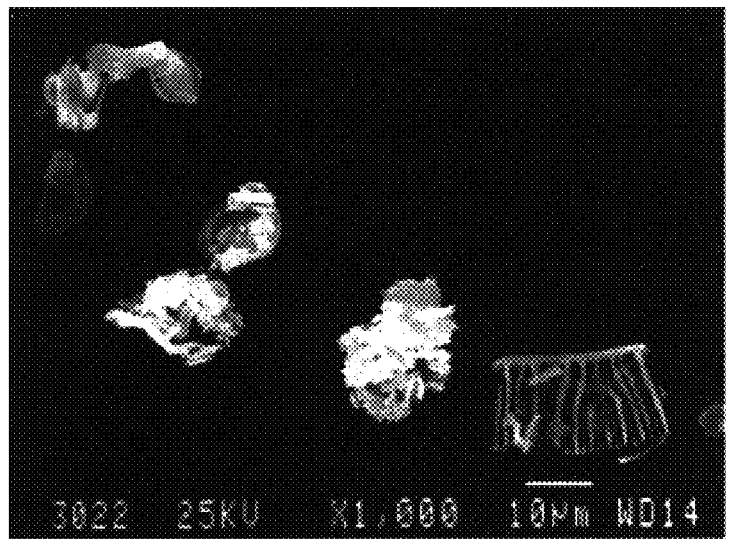
FIG. 11 is a magnified (×1,000) view of natural silica, excerpt from *Plastics Additives Handbook,* Ed. Hans Zweifel, 5th Edition, Munich: Hanser, 2000.
Figure 12:
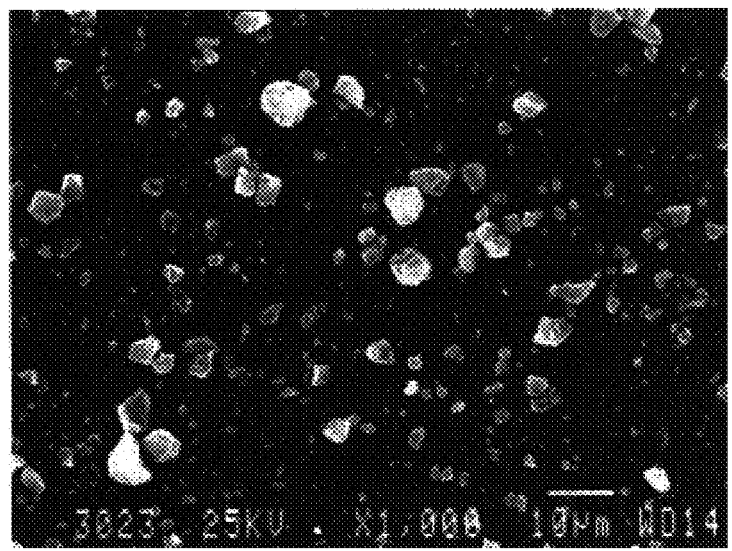
FIG. 12 is a magnified (×1,000) view of synthetic silica, excerpt from *Plastics Additives Handbook,* Ed. Hans Zweifel, 5th Edition, Munich: Hanser, 2000.

Glass transparency and low haze-causing properties of particle type anti-blocking agents, in particular inorganic particle type anti-blocking agents, are important characteristics for the production of highly transparent films. As discussed above, the refractive index of PE and PP is 1.49 and 1.50 respectively. For the manufacture of glass transparent PE or PP film, an ideal glass transparent inorganic particle type high effectiveness anti-blocking agent should have a refractive index from 1.49-1.50, so that light passing through the PE or PP film incorporated with such an anti-blocking agent will keep very much to its original direction and the original strength, thus minimizing the production of haze.

According to a theory held by the inventor, in order to achieve glass transparency in the resultant PE and PP films, in addition to the fact that the anti-blocking agents have a refractive index from 1.49 to 1.50, such should also possess one or more of the following characteristics:

1. primary particles of the anti-blocking agents have diameters less than 0.4 microns;
2. secondary particles formed of the primary particles of the anti-blocking agents are of a linear chain shape construction;
3. a majority of the secondary particles are of a diameter less than the wavelength of visible light, i.e. 0.4-0.7 microns;
4. tertiary particles formed of agglomeration of such secondary particles are similar in shape to natural sea sponge, i.e. with a number of channels through the tertiary particles.

It is also the inventor's theory that, to further enhance the glass-transparency function, the primary particles should be smooth or round, i.e. without sharp edges, and that pre-coating of the anti-blocking agents by a migrating agent can enhance the anti-blocking function of the product.

Based on the above theories, it has been found, after much selection and many experiments, that a particular zeolite produced and traded by Degussa AG, of Germany, under the trade name EXP 5700-1, fulfills the above requirements, and is found to be particularly good as being an anti-blocking agent in the production of PE and PP films, and can provide excellent glass transparency effect, and various other advantages. Since EXP 5700-1 is a zeolite, it has a refractive index of 1.50 (see *Plastics Additives Handbook*, Ed. Hans Zweifel, 5th Edition, Munich: Hanser, 2000, p. 588).

Zeolites are crystalline, hydrated alumosilicates with the general chemical formula $Me^{n}_{y/n}[(SiO_2)_x(AlO_2)_y]*zH_2O$, where Me is an alkali metal or alkaline earth cation. For EXP 5700-1, the analytical information relating to its physico-chemical data is shown in the following Table 1:

TABLE 1

| Property and Testing Method | Unit | Result |
| --- | --- | --- |
| Specific surface area ($N_2$) Areameter (following ISO 5794-1, Annex D) | $m^2/g$ | 85 |
| Mean particle size Multisizer, 100 μm capillary (following ASTM C 690-1992) | μm | 5 |
| Loss on drying 2 hours at 105° C. (following ISO 787-2) | % | 6 |
| pH value 5% in water (following ISO 787-9) | — | 10.1 |
| DBP absorption Based on dried substance (following DIN 53601) | g/100 g | 200 |
| Sieve residue 45 μm Spray (following ISO 3262-19) | % | 0.05 |
| $SiO_2$ content Based on ignited substance (following ISO 3262-19) | % | 82 |
| Na content as $Na_2O$ Based on ignited substance (following ISO 3262-18) | % | 8 |
| Al content as $Al_2O_3$ Based on ignited substance (following ISO 3262-18) | % | 9.5 |
| Luminance factor Y Following DIN 53163 | — | 97 |

Figure 13:
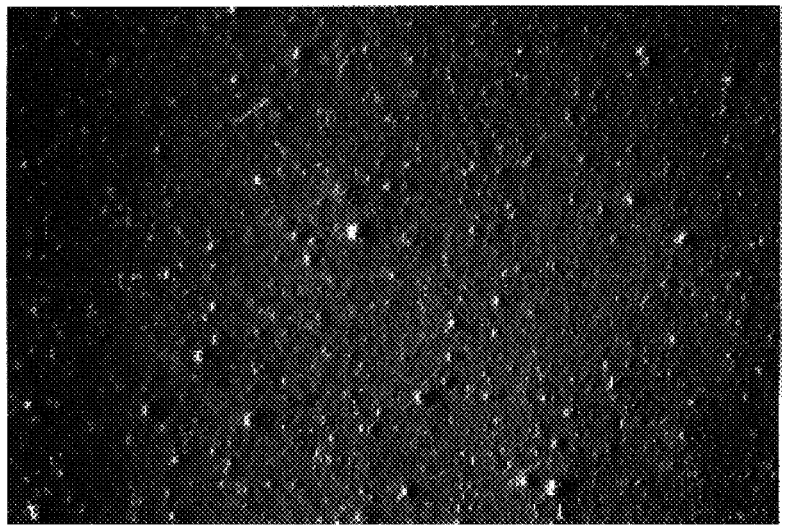
FIG. 13 is a magnified (×60) view of a PE film according to the present invention.
Figure 14:
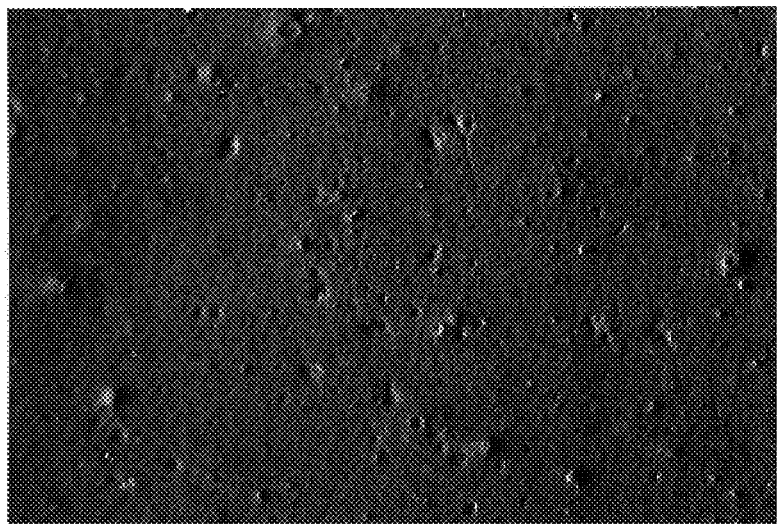
FIG. 14 is a magnified (×60) view of a PE film incorporated with a conventional anti-blocking agent.

Referring to FIG. 13, such shows a magnified (×60) view of a PE film according to the present invention, produced by adding 0.5 wt. % migration additive (erucamide) surface treated EXP 5700-1 masterbatch, which contains 10 wt. % of EXP 5700-1 as anti-blocking agent. The image was obtained under a microscope and horizontal light. It can be seen that there are a large number of anti-blocking agent particles protruding from the surface of the film. The film thus has a high degree of surface roughness. As to FIG. 14, such shows a magnified (×60) view of a PE film, not according to the present invention, produced by adding 0.5 wt. % of a synthetic silica anti-blocking agent masterbatch, which contains 10 wt. % of a synthetic silica. The film has significantly fewer protruding particles, and the film surface is less rough. Again, the image was obtained under a microscope and horizontal light.

Figure 15:
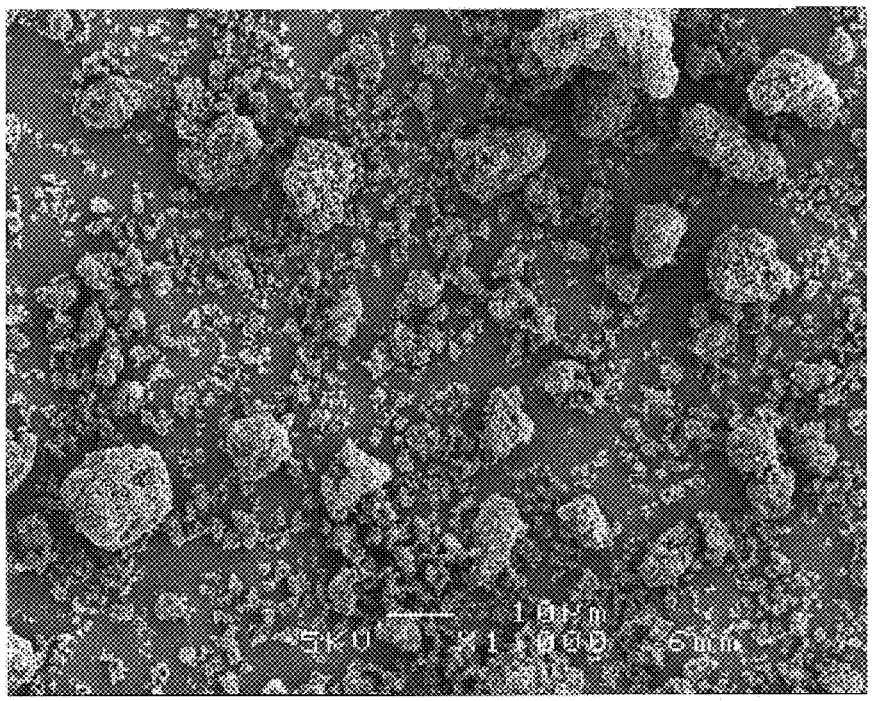
FIG. 15 is a magnified (×1,000) view of the anti-blocking agent used in the manufacture of the film shown in FIG. 13.
Figure 16:
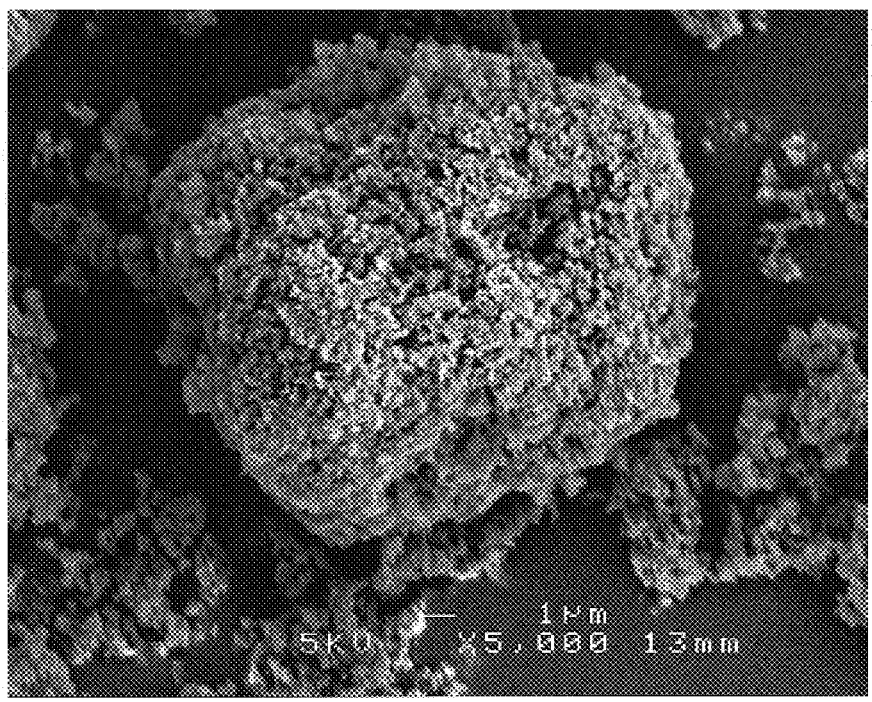
FIG. 16 is a magnified (×5,000) view of the anti-blocking agent used in the manufacture of the film shown in FIG. 13.
Figure 17:
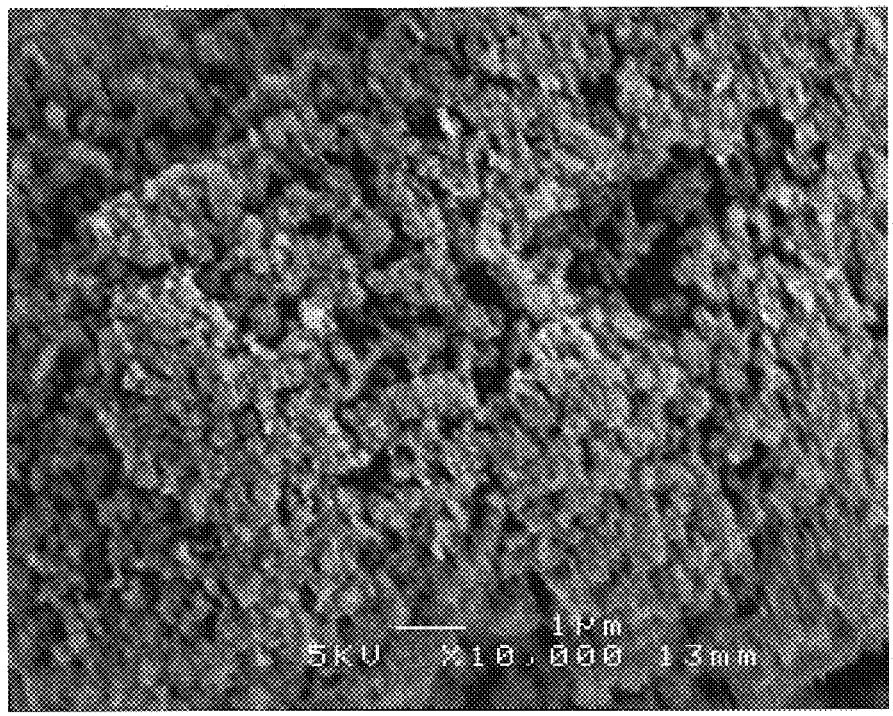
FIG. 17 is a magnified (×10,000) view of the anti-blocking agent used in the manufacture of the film shown in FIG. 13.
Figure 24:
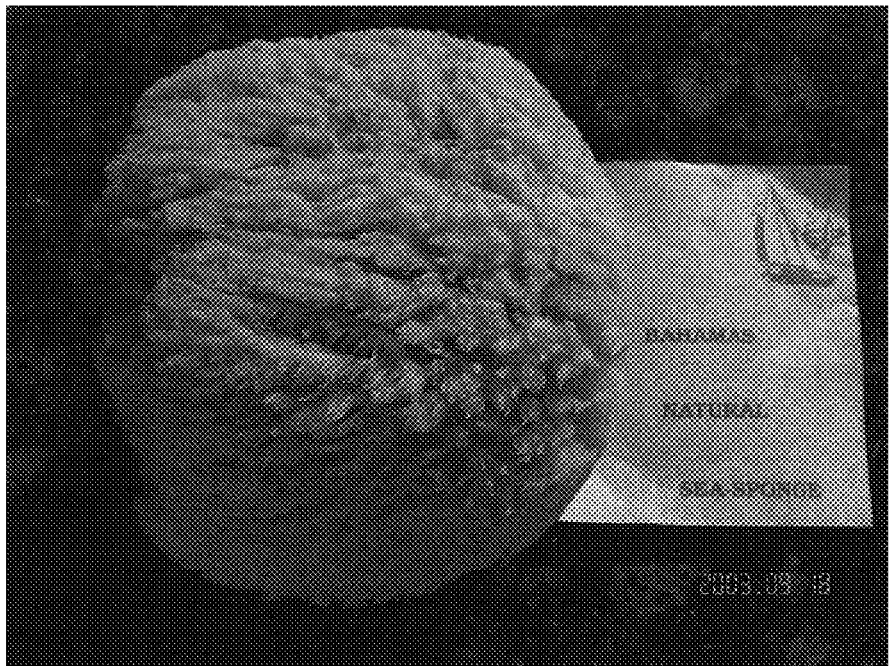
FIG. 24 shows a natural sea sponge.

FIGS. 15 to 17 are respectively, a 1,000 times scanning electron microscope (SEM) photo, a 5,000 times SEM photo, and a 10,000 times SEM photo, of the particles of EXP 5700-1. Such show clearly that the primary particles have diameters less than 0.4 micron, and that the primary particles aggregate to form secondary particles which have a linear chain shape construction. Most of the linear chain shape secondary particles have diameters less than the wavelength of visible light, i.e. 0.4-0.7 micron. A certain proportion of secondary particles aggregate as block shape, whose diameter is also less than the wavelength of visible light, i.e. 0.4-0.7 micron. The secondary aggregated particles also agglomerate to natural sea sponge-like tertiary particles, with diameters in the micron range. The structure of the blocks is between aggregation and agglomeration. In addition, it is can be seen that the tertiary particles are of a natural sea sponge-like structure, i.e. with a number of channels through the particles. In particular, it can be seen that the shape of the tertiary particles of EXP 5700-1 is very similar to that of natural sea sponge, as shown in FIG. 24. The shapes of the primary particles are round or smooth, i.e. without sharp edges. When visible light passes through the gap of the agglomerated natural sea sponge-like structure, the light will not be refracted to various directions but can still keep the strength of the original light. The smoothness or roundness of the edges of the primary particles will also cause less abrasion when processed by machines, as smooth and round particles do not have sharp edges to cut the metal surfaces of the equipment.

Furthermore, it is generally known that adding smooth shape inorganic particles in plastics will reduce the tensile strength and elongation at break, even the particle surface has had wetting agent treatment or coupling agent treatment. However, when such natural sea sponge-like structured particles are added to plastics, especially since the natural sea sponge-like structured particles have teeth-type surfaces and cracks on its surface, the surrounding plastics resins can "bite" on the surface of the particles. A higher energy level will be required to separate the surrounding plastics from the anti-blocking agent particles. There will thus be less reduction in both the plastics tensile strength and elongation at break.

Figure 18:
FIG. 18 is a magnified (×1,000) view of an anti-blocking agent traded by Degussa AG under the trade name SIPERNAT® 900, an existing anti-blocking agent.
Figure 19:
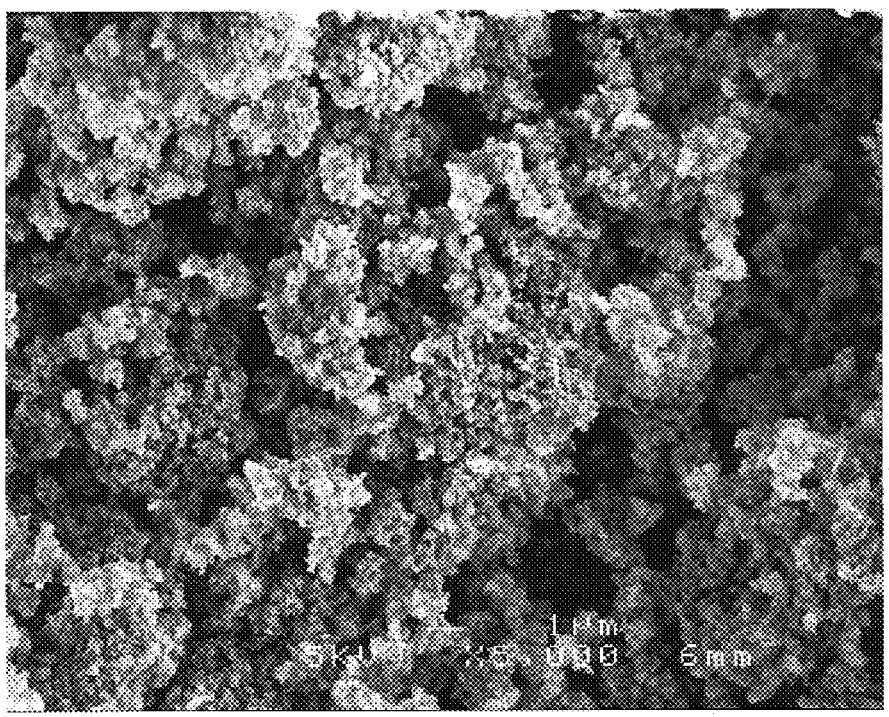
FIG. 19 is a magnified (×5,000) view of SIPERNAT® 900 shown in FIG. 18.
Figure 20:
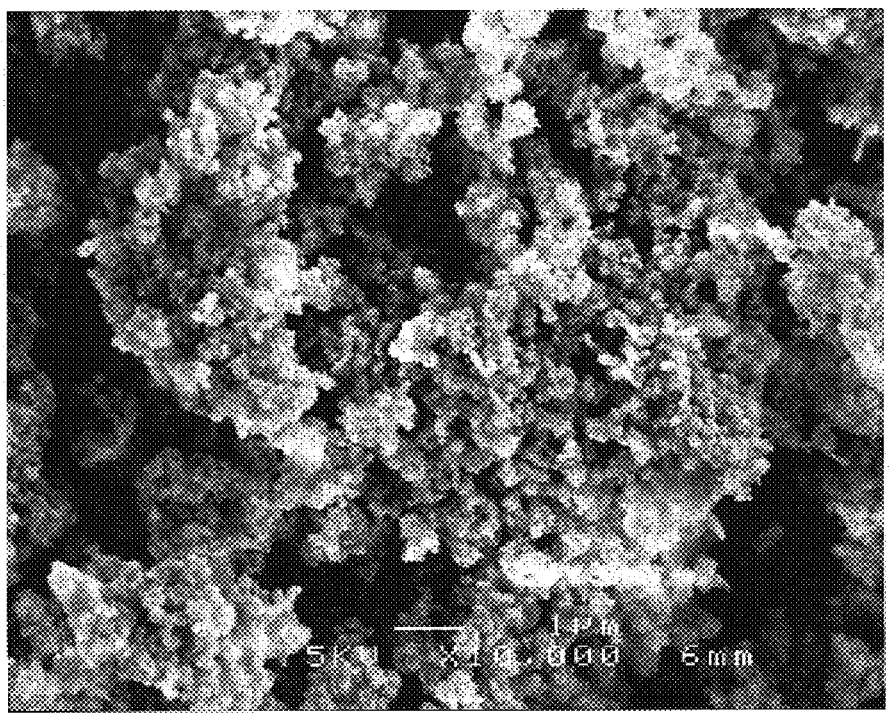
FIG. 20 is a magnified (×10,000) view of SIPERNAT® 900 shown in FIG. 18.

FIGS. 18 to 20 show, respectively, a magnified (×1,000) view, a magnified (×5,000) view, and a magnified (×10,000) view of particles of Sipernat® 900 anti-blocking agents traded by Degussa AG. It can be seen that although the primary particles aggregate to form secondary particles, most of the secondary particles have diameters larger than the wavelength of visible light, i.e. 0.4-0.7 micron. In addition, although some secondary particles have linear chain shape structure, such do not constitute a main proportion thereof. Film blowing experiments show that if the shape of secondary aggregated particles have linear chain diameter larger than the wavelength of visible light, or if most of the secondary particles are not of a linear chain shape construction, but that there is a certain proportion of block shape secondary particles, then even the primary particles have the same chemical structure as zeolite and have smooth or round shape, the use of such tertiary particles as anti-blocking agents still cannot attain glass transparency in PE or PP film. FIGS. 18-20 show that the secondary particles in Sipernat® 900 are of an aggregated linear chain structure with a diameter larger than 0.4-0.7 micron. When such is added in the production of PE film, although there is less haze than in the case in which silica particles are used as anti-blocking agents, the film still cannot achieve glass transparency.

Figure 21:
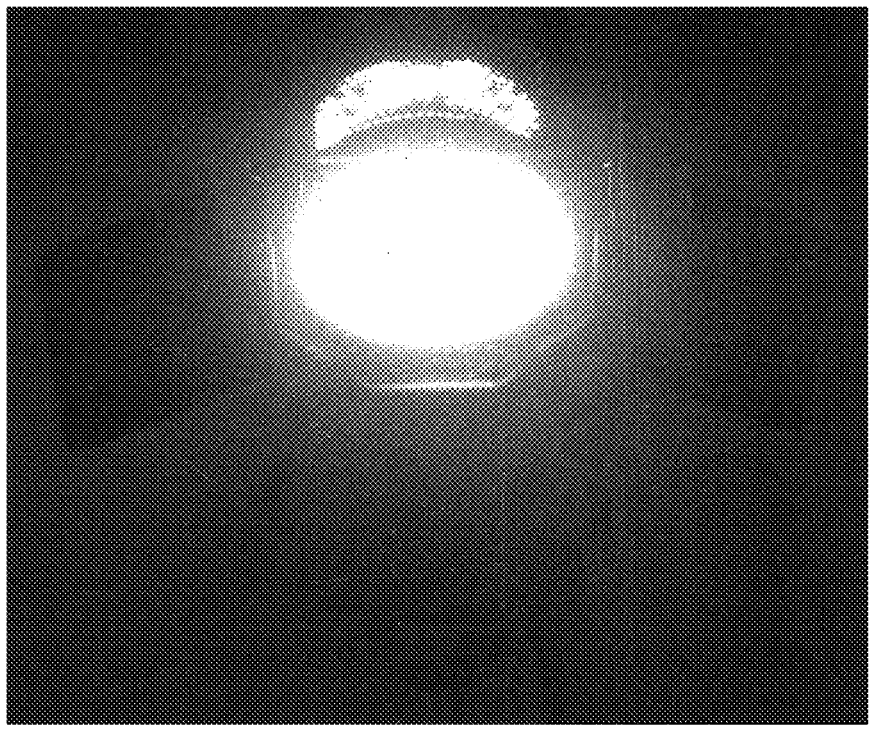
FIG. 21 shows a 0.02 mm thick PE film according to the present invention, incorporated with EXP 5700-1, illuminated under strong light from a 1,000 W halogen lamp.

FIG. 21 shows a PE film of a thickness of 0.02 mm, added with 2 wt. % glass transparent anti-blocking agent masterbatch according to the present invention, which contains 10 wt. % glass transparent natural sea sponge-like structure inorganic particle type anti-blocking agent, e.g. EXP 5700-1, illuminated under strong transmission light from a 1,000 W halogen lamp. Human eyes cannot clearly see the anti-blocking agent particles. The film has very high transparency.

Figure 22:
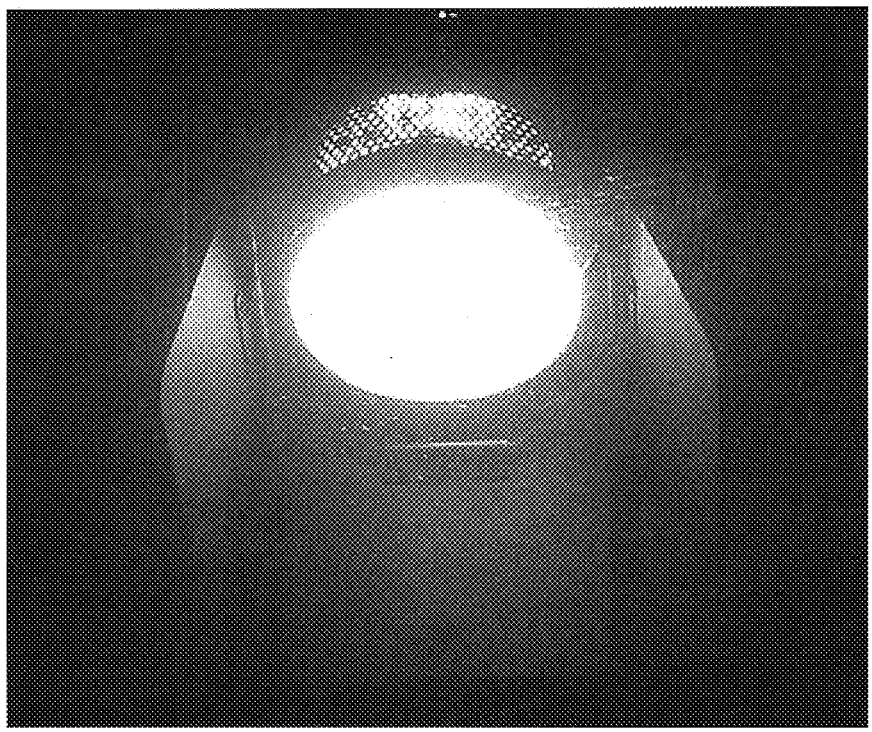
FIG. 22 shows a 0.02 mm thick PE film incorporated with SIPERNAT® 900, illuminated under strong light from a 1,000 W halogen lamp.

FIG. 22 shows a PE film of a thickness of 0.02 mm, added with 2 wt. % zeolite anti-blocking agent (Sipernat® 900 of Degussa AG) masterbatch, which contains 10 wt. % zeolite anti-blocking agent illuminated under strong transmission light from a 1,000 W halogen lamp. Human eyes can clearly see an obvious haze caused by the anti-blocking agent particles.

Figure 23:
FIG. 23 shows a 0.02 mm thick PE film incorporated with a silica anti-blocking agent, illuminated under strong light from a 1,000 W halogen lamp.

FIG. 23 shows a PE film of a thickness of 0.02 mm, added with 2 wt. % synthetic silica anti-blocking agent masterbatch (A. Schulman 105E, made by A. Schulman, a Belgian factory), which contains 10 wt. % high quality synthetic silica under strong transmission light from a 1,000 W halogen lamp. Again, human eyes can clearly see the anti-blocking agent particles.

Figure 25:
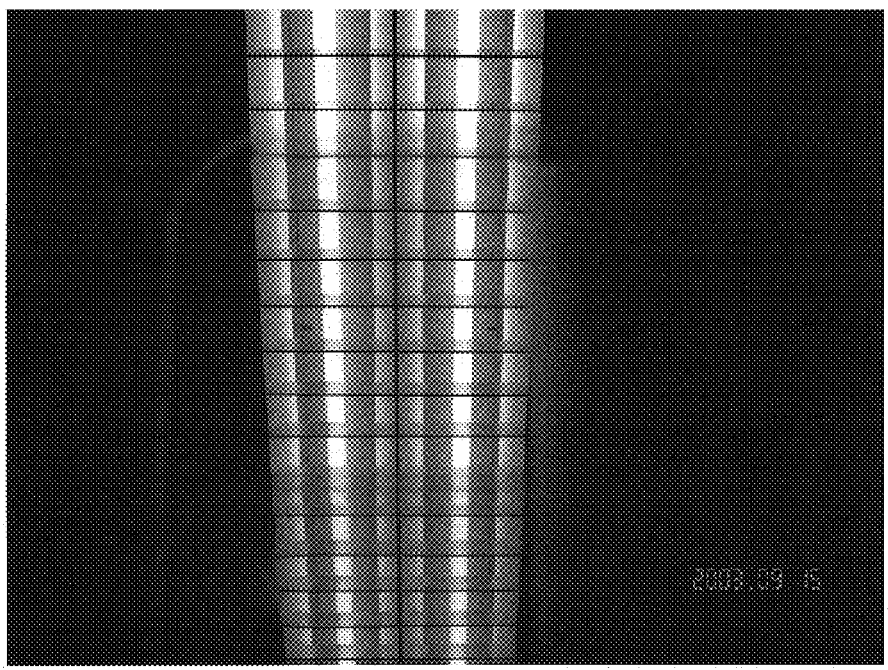
FIG. 25 shows a transparent PP molded chip (in a stepped shape) according to the present invention, as illuminated under light from fluorescent lamps.
Figure 26:
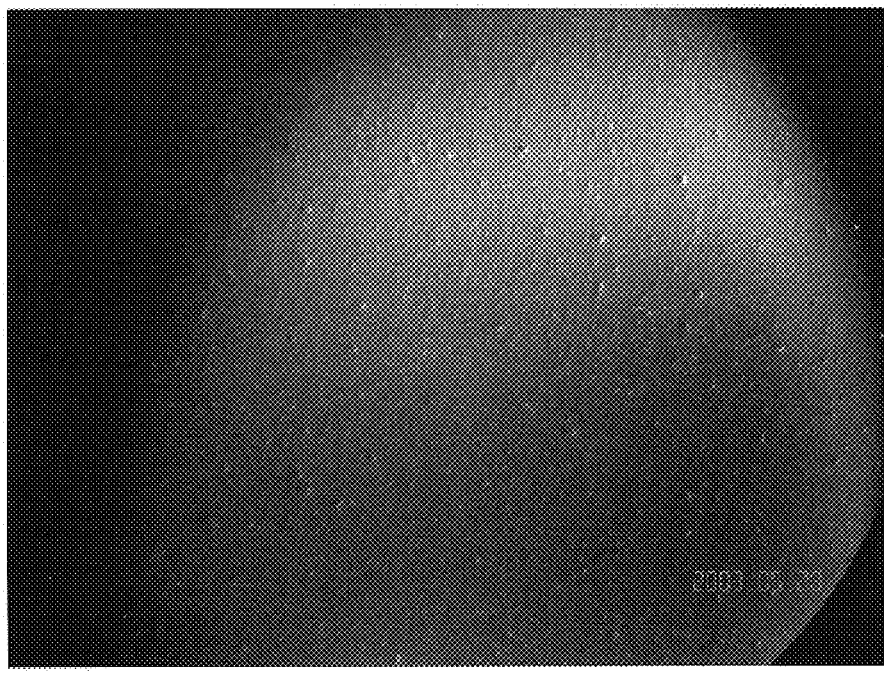
FIG. 26 shows a magnified view of the surface of the PP chip shown in FIG. 25.

Turning to FIG. 25, such shows a PP molded chip (in a stepped shape) according to the present invention, as illuminated under light from fluorescent lamps. The part of the PP molded chip nearer to the top of the photograph is of a thickness of 1 mm and the part nearer to the bottom of the photograph is of a thickness of 2 mm. The PP has been added with 2 wt. % of a anti-blocking masterbatch containing 10 wt. % of EXP 5700-1. A migrating agent, erucamide, has also been pre-coated on the anti-blocking agents. It can be seen that, when illuminated under light from fluorescent lamps, no anti-blocking agent particles can be seen by human eyes. In particular, the chip is water clear on a vertical direction of the chip. FIG. 26 shows a magnified view of the surface of the PP chip shown in FIG. 25, obtained by using bright/dark field light microscope technique. It can be seen that a large number of the anti-blocking agents migrate to the surface of the injection molded PP chip.

For producing a glass transparent high effectiveness low abrasion anti-blocking agent masterbatch, the EXP 5700-1 particles are first ground by using high-speed blade type grinders, e.g. Henschel mixers. For making the particles protrude more on PE and PP film surfaces, coating of migrating agent, e.g. amide waxes is suggested. Such may be erucamide. The proportion may be 5 or more parts of the migration additive for each 100 parts of the above anti-blocking agent. High-speed blade type mixers or ribbon type mixers may be used for the coating process. The coating process has to be undertaken at a temperature of 40° C.-70° C., when amide waxes become soft.

Conventional twin screw extruders can be used for making the anti-blocking agent masterbatch, but some special high shear single screw extruders, e.g. a double wave single screw extruder made by HPM, can be used as well. Low molecular weight polyethylene (PE waxes) of various grades may be used as dispersion aid for making the masterbatch. Low molecular weight polypropylene (PP waxes) of various grades may be used for making PP film anti-blocking agent masterbatch.

The anti-blocking agent masterbatch may have 10 wt. % of inorganic particle type anti-blocking agent, as is popularly practised. However, it is acceptable that such consists only of 5 wt. % of inorganic particle type anti-blocking agent. Masterbatch formulae combined with organic anti-blocking agents, e.g. oleamide or erucamide, are also feasible.

Alternatively, anti-blocking agents comprising EXP 5700-1 may be added directly in PE and PP resins during the polymerization process, i.e. adding at pelletizing section of the polymerization process. As the pelletizing section of most polymerization factories use large size twin screw extruders, and the shear force is very big in such large size twin screw extruders, it is possible to add such glass transparent natural sea sponge-like structured inorganic particle type anti-blocking agent directly in PE and PP resin at the pelletizing section during the polymerization process. Different methods may be adopted for adding powder type additives in PE and PP resins at the pelletizing section, e.g. making additives suspension liquids first, and trough liquid pump inject in pelletizing twin screw extruder; or making additives masterbatch first, and then add the masterbatch in pelletizing twin screw extruders via gravimetric feeders. In some cases, anti-blocking agents powder may be added directly to large size pelletizing twin screw extruders. The resultant resin may contain the zeolite from 0.02 wt. % (i.e. 200 ppm) to 0.5 wt. % (i.e. 5,000 ppm).

It should be understood that the above description only illustrates and describes examples whereby the present invention may be carried out, and that modifications and/or alterations may be made thereto without departing from the scope of the invention as defined by the claims.

The invention claimed is:

1. A plastics film comprising (a) polyethylene or polypropylene and (b) a zeolite as an anti-blocking agent, wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

2. A plastics film according to claim 1 wherein said anti-blocking agent is of a refractive index of substantially 1.50.

3. A plastics film according to claim 1 wherein at least part of said majority of secondary particles agglomerate to form tertiary particles.

4. A plastics film according to claim 3 wherein said tertiary particles include teeth-type surfaces.

5. A plastics film according to claim 3 wherein said tertiary particles include cracks on its surfaces.

6. A plastics film according to claim 1 wherein said primary particles are substantially free of sharp edges.

7. A plastics film according to claim 1 further including a migrating agent.

8. Method of producing a plastics film made of at least polyethylene or polypropylene, comprising adding a zeolite as an anti-blocking agent to a composition comprising polyethylene or polypropylene, wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

9. A method according to claim 8 wherein said anti-blocking agent is of a refractive index of substantially 1.50.

10. A method according to claim 8 wherein at least part of said majority of secondary particles agglomerate to form tertiary particles.

11. A method according to claim 10 wherein said tertiary particles include teeth-type surfaces.

12. A method according to claim 10 wherein said tertiary particles include cracks on its surfaces.

13. A method according to claim 8 wherein said primary particles are substantially free of sharp edges.

14. A masterbatch for the production of a plastics film, comprising (a) polyethylene or polypropylene and (b) a zeolite as an anti-blocking agent, wherein primary particles of said anti-blocking agent are of a diameter of less than substantially 0.4 micron, wherein a majority of secondary particles of said zeolite formed of aggregation of said primary particles are of a diameter of less than substantially 0.4 micron, and wherein said majority of secondary particles are of a linear chain shape structure.

15. A masterbatch according to claim 14 wherein said anti-blocking agent is of a refractive index of substantially 1.50.

16. A masterbatch according to claim 14 wherein at least part of said majority of secondary particles agglomerate to form tertiary particles.

17. A masterbatch according to claim 16 wherein said tertiary particles include teeth-type surfaces.

18. A masterbatch according to claim 17 wherein said tertiary particles include cracks on its surfaces.

19. A masterbatch according to claim 14 wherein said primary particles are substantially free of sharp edges.

20. A masterbatch according to claim 14 including from 5 wt. % to 10 wt. % of said anti-blocking agent.

21. A masterbatch according to claim 14 further including an organic anti-blocking agent.

22. A masterbatch according to claim 21 wherein said organic anti-blocking agent is oleamide or erucamide.

23. A masterbatch according to claim 14 wherein said anti-blocking agent is pre-coated with a migrating agent.

24. A masterbatch according to claim 23 wherein said migrating agent is an amide wax.

25. A masterbatch according to claim 24 wherein said amide wax is erucamide.

26. A method of producing an anti-blocking masterbatch, comprising the step of adding zeolite into polyethylene or polypropylene resin during polymerization process as an anti-blocking agent, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

27. A method according to claim 26 further including the step of coating said anti-blocking agent with a migrating agent.

28. A method according to claim 27 wherein said migrating agent is an amide wax.

29. A method according to claim 28 wherein said amide wax is erucamide.

30. A method according to claim 27 wherein the proportion between the mitrating and the zeolite is at least substantially 5 parts of said migrating agent for each 100 parts of said zeolite.

31. A method according to claim 27 wherein said coating is undertaken at a temperature of 40° C. to 70° C.

32. A polyethylene or polypropylene resin comprising a zeolite as an anti-blocking agent, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

33. A resin according to claim 32 wherein said anti-blocking agent is of a refractive index of substantially 1.50.

34. A resin according to claim 32 wherein at least part of said majority of secondary particles agglomerate to form tertiary particles.

35. A resin according to claim 34 wherein said tertiary particles include teeth-type surfaces.

36. A resin according to claim 35 wherein said tertiary particles include cracks on its surfaces.

37. A resin according to claim 32 wherein said primary particles are substantially free of sharp edges.

38. A resin according to claim 32 including from 0.02 wt. % to 0.5 wt. % of said anti-blocking agent.

39. A resin according to claim 32 further including an organic anti-blocking agent.

40. A resin according to claim 39 wherein said organic anti-blocking agent is oleamide or erucamide.

41. A resin according to claim 32 wherein said anti-blocking agent is pre-coated with a migrating agent.

42. A resin according to claim 41 wherein said migrating agent is an amide wax.

43. A resin according to claim 42 wherein said amide wax is erucamide.

44. A method of producing a polyethylene or polypropylene resin, comprising the step of adding a zeolite into polyethylene or polypropylene resin during polymerization process, wherein primary particles of said zeolite are of a diameter of less than substantially 0.4 micron, and secondary particles of said zeolite are formed of aggregation of said primary particles, and a majority of said secondary particles are of a diameter of less than substantially 0.4 micron, and wherein said majority of secondary particles are of a linear chain shape structure.

45. A method according to claim 44 wherein said zeolite is added into said resin during a pelletizing stage of the polymerization process.

46. A method according to claim 44 wherein said zeolite is added to a large size pelletizing twin screw extruder.

47. A method according to claim 44 wherein said zeolite is in powder form.

\* \* \* \* \*